United States Patent Office 3,513,191
Patented May 19, 1970

3,513,191
2-AMINO-α-SUBSTITUTED-BENZYLIDENEAMINES
AND METHODS FOR MAKING THE SAME
Stanley C. Bell, Penn Valley, Pa., assignor to American
Home Products Corporation, New York, N.Y., a corporation of Delaware
No Drawing. Original application July 25, 1963, Ser. No.
297,705. Divided and this application Aug. 8, 1966,
Ser. No. 572,646
Int. Cl. C07c *101/44;* C07d *63/12*
U.S. Cl. 260—518                                    6 Claims

ABSTRACT OF THE DISCLOSURE 2-aminobenzylideneamines are prepared by cleavage of 1,3-dihydro-2H-1,4-benzodiazepin-2-ones. The cleavage products are pharmacologically active.

---

This is a divisional application of my co-pending application, Ser. No. 297,705, filed July 25, 1963 now abandoned, which is, in turn, a continuation-in-part of my previous application, Ser. No. 213,003, filed July 27, 1962 now abandoned.

This invention relates to new 2-aminobenzylideneamines. More particularly, it is concerned with substituted 2-amino-α-substituted-benzylideneamines, N-oxides, salts and geometric isomers thereof.

The substituted 2-aminobenzylideneamines disclosed herein possess valuable pharmacological properties. They are effective as anticonvulsants, as sedatives and as muscle relaxants. The compounds of this invention are very valuable in veterinary medicines.

The pharmacologically active compounds of this invention may be administered parenterally or orally in conventional dosage forms such as tablets, powders, injectables, etc.

The compounds of the invention are represented by the following general formulae:

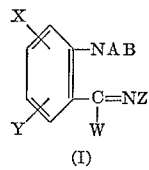

(I)

and

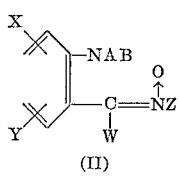

(II)

wherein: X and Y are selected from the group consisting of hydrogen, halogen, nitro, lower alkyl, preferably having up to 9 carbon atoms in the chain and halo(lower) alkyl having up to 2 carbon atoms such as trifluoromethyl; A is selected from the group consisting of hydrogen, lower alkyl, lower acyl, halo(lower) acyl and aralkyl having up to 7 carbon atoms; B is hydrogen or lower alkyl; Z is a radical selected from the group consisting of (lower)alkyl, lower aralkyl, hydroxy(lower)alkyl, alkoxyalkyl, dialkoxyalkyl, mercapto alkyl, in which the alkyl and alkoxy groups have up to 2 carbon atoms, aminoalkyl having up to 7 carbon atoms, carboxyalkyl having up to 2 carbon atoms, acyloxyalkyl having up to 5 carbon atoms, and alkylthioalkyl having up to 3 carbon atoms; W is a member selected from the group consisting of the lower alkyl and aryl radicals such as methyl, phenyl, 2-furyl, or 2-thienyl. Compounds where W is phenyl substituted by halogen, lower alkoxy, lower alkyl, or halo(lower)alkyl are full equivalents of the subject matter to be patented.

The compounds of the invention may be prepared by methods illustrated schematically below wherein the substituents have the significance above noted, R is hydrogen, lower alkyl or aryl and M is an alkali metal cation, such as sodium, lithium, potassium, rubidium and cesium. F is the same as Z except that it does not represent carboxyalkyl or acyloxyalkyl.

METHOD I

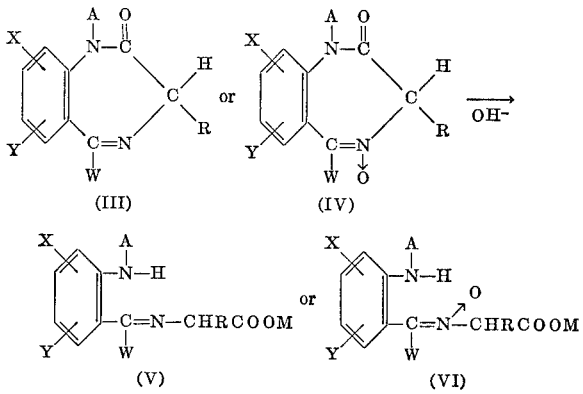

METHOD II

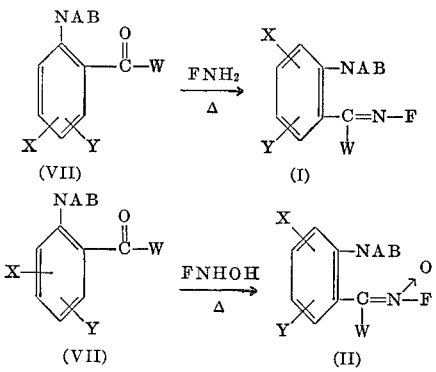

In Method I, ring cleavage between the one and two positions of a 1,3-dihydro-2H-1,4-benzodiazepin-2-one or -2-one 4-oxide is effected by treating with dilute alkali metal hydroxide to yield the alkali metal salt of a substituted 2 - amino-α-substituted-benzylideneaminoacetic acid or of its N-oxide, respectively. Acidification of the N-oxide yields the free imino acid, N-oxide.

The starting products used in Method I may be prepared by known methods. One such method comprises acylating a 2-aminophenyl ketone with an α-chloroacyl chloride to give a 2-(α-chloroacylamino) phenyl ketone which undergoes ring closure when treated with alcoholic ammonia to form a 1,3-dihydro-2H-1,4-benzodiazepin-2-one. Another synthesis of the starting materials comprises the condensation of a 2-aminophenyl ketone with hydroxylamine to form its corresponding oxime. The resulting aminophenyl ketone oxime is then acylated with an α-haloacyl halide to form the corresponding haloacylamino oxime, which undergoes ring closure under acid conditions to form a 2-(α-haloalkyl)-quinazoline 3-oxide. Treatment of this compound with a strong base results in ring enlargement with the formation of a 1,3-dihydro-2H-1,4-benzodiazepin-2-one 4-oxide.

In Method II, which is suitable for the preparation of a wider number of compounds than Method I, an appropriately substituted phenone is condensed by heating with a suitably substituted primary amine. Optionally, Method II may be carried out in an inert solvent such as xylene, toluene or hexanol and if desired, with a catalytic amount of an acid catalyst such as zinc chloride or toluene-sulfonic acid. Upon cooling, water is added to the mixture to precipitate the product which can be purified by crystallizing from a water-alcohol mixture and then from a benzene-hydrocarbon mixture. In the special case where the amine reagent is benzylamine, the product is ordinarily a mixture of N-(2-amino-5-chloro-α-phenylbenzylidene) benzylamine and of its tautomer, N-(2-amino-5-chloro-α-phenylbenzyl) benzaldehyde imine.

Method III is identical with Method II except that a substituted hydroxylamine is used instead of a primary amine.

Methods II and III lead to the possible production of two geometric isomers (α and β forms) because of the formation of a carbon-nitrogen double-bond. Where both isomers are stable and isolable, the present invention naturally comprehends both forms. Separation of the α- from the β-isomers can be achieved by known techniques, such as fractional crystallization.

The following specific examples in which all temperatures are in degrees centigrade serve to illustrate the invention.

Example 1

A solution of 2.0 g. of 7-chloro-1,3-dihydro-1-methyl-5-phenyl-2H-1,4-benzodiazepin-2-one 4-oxide in 15 ml. of ethanol, 15 ml. of water and 15 ml. of 10 N sodium hydroxide solution is warmed for several minutes. The resultant sodium salt is filtered, dissolved in water and the free acid precipitated out by the addition of acetic acid. Recrystallization from acetonitrile gave 5-chloro-2-methylamino-α-phenylbenzylideneaminoacetic acid N-oxide, M.P. 150–1° (dec.).

The analytical data confirmed the empirical formula

The N-oxide so obtained is converted back to 7-chloro 1,3-dihydro-1-methyl-5-phenyl - 2H - 1,4-benzodiazepin-2-one-6-4-oxide by treatment with hot, aqueous alcoholic hydrochloric acid.

Example 2

By following the procedure of Example 1, 7-chloro-1,3-dihydro - 5 - phenyl-2H-1,4-benzodiazepin-2-one 4-oxide is converted to 2 - amino-5-chloro-α-phenylbenzylidene aminoacetic acid N-oxide, M.P. 151–2°.

Analysis.—Calc'd for $C_{15}H_{13}ClN_2O_3 \cdot \frac{1}{2}H_2O$ (percent): C, 57.42; H, 4.50; N, 8.93; Cl, 11.30; $H_2O$, 2.87. Found (percent): C, 57.57; H, 4.57; N, 9.14; Cl, 11.40; $H_2O$, 2.7.

This compound was converted to the sodium salt, M.P. 220–2°.

Analysis.—Calc'd for $C_{15}H_{12}ClN_2O_3Na$ (percent): N, 8.57; Cl, 10.85. Found (percent): N, 8.57; Cl, 10.74.

The 2 - amino-5-chloro-α-phenylbenzylideneaminoacetic acid N-oxide is converted back to 7-chloro-1,3-dihydro-5-phenyl - 2H-1,4-benzodiazepin-2-one 4-oxide by treatment with aqueous alcoholic hydrochloric acid.

Example 3

By following the procedure of Example 1, 7-chloro-1,3-dihydro-5-phenyl - 2H - 1,4-benzodiazepin-2-one is converted to the sodium salt of 2-amino-5-chloro-α-phenylbenzylideneaminoacetic acid, M.P. 218°.

Analysis.—Calc'd for $C_{15}H_{12}ClN_2O_2Na$ (percent): Cl, 11.41; Na, 7.40; M.W. 316.73. Found (percent): Cl, 11.50; Na, 7.50.

On treatment with cold dilute acid, this compound is converted back to 7-chloro-1,3-dihydro-5-phenyl-2H-1,4-benzodiazepin-2-one with some accompanying hydrolysis to 2-amino-5-chlorobenzophenone and glycine.

Example 4

By following the procedure of Example 1, 7-chloro-1,3-dihydro - 1 - methyl-5-phenyl-2H-1,4-benzodiazepin-2-one is converted to the sodium salt of 5-chloro-2-methylamino-α-phenylbenzylideneaminoacetic acid, M.P. 265°.

Analysis.—Calc'd for $C_{16}H_{24}ClN_2O_2Na$ (percent): N, 8.63; Cl, 10.92. Found (percent): N, 8.44; Cl, 10.70; M.W. 324.75.

Example 5

A mixture of 3.0 g. of 2-amino-5-chlorobenzophenone and 30 ml. of ethanolamine is refluxed for 4 hours. Upon cooling, the reaction mixture is diluted with water and the product that separates is recrystallized from water-alcohol and then benzene-cyclohexane to give pure 2-(2-amino-5-chloro-α-phenylbenzylideneamino) ethanol, M.P. 122–124°.

Analysis.—Calc'd for $C_{15}H_{15}ClN_2O$ (percent): C, 65.56; H, 5.50; N, 10.20; Cl, 12.90; M.W. 274.75. Found (percent): C, 65.55; H, 5.44; N, 10.40; Cl, 12.90.

Example 6

3-aminopropanol is reacted with 2-amino-5-chlorobenzophenone, according to the procedure in Example 5, to give 3-(2-amino-5-chloro-α-phenylbenzylideneamino) propanol, M.P. 107–109°.

Analysis.—Calc'd for $C_{16}H_{17}ClN_2O$ (percent): C, 66.50; H, 5.92; N, 9.70. Found (percent): C, 66.26; H, 5.96; N, 9.66.

Example 7

3-morpholinopropylamine is reacted with 2-methylamino-5-chlorobenzophenone according to the procedure of Example 5 to give 4-[3-(2-methylamino-5-chloro-α-phenylbenzylideneamino)propyl]morpholine.

Example 8

2-ethoxyethylamine is reacted with 2-amino-5-ethylbenzophenone according to the procedure of Example 5 to give 2-(2-amino-5-ethyl-α-phenylbenzylideneamino) ethoxyethane.

Example 9

2-(2 - amino - 5 - nitro-α-phenylbenzylideneamino) ethoxy-ethane is reacted with acetic anhydride in pyridine to give 2-(2-acetamido-5-nitro-α - phenylbenzylideneamino)ethoxyethane.

Example 10

Ethanolamine is reacted with 2-amino-5-trifluoromethylbenzophenone according to the procedure of Example 5 to give 2-(2-amino-5-trifluoromethyl-α-phenylbenzylideneamino)ethanol.

Example 11

2-amino-5-chlorophenyl-2-thienyl ketone is reacted with 2-2-morpholinoethylamine according to the procedure of Example 5 to give 4-(-[2-amino-5-chloro-α-(2-thienyl) benzylideneamino]ethyl)morpholine.

Example 12

2-amino-5-chlorobenzophenone is reacted with β-phenethylamine according to the procedure of Example 5 to give 1-(2-amino-5-chloro-α-phenylbenzylideneamino)-2-phenylethane.

Example 13

2-amino-5-chlorobenzophenone is reacted with 2-aminoethanethiol according to the procedure of Example 5 to give 2-(2-amino-5-chloro-α-phenylbenzylideneamino)ethanethiol.

Example 14

A solution of 3-(2-amino-5-chloro-α-phenylbenzylideneamino)propanol in pyridine was treated with acetic anhydride and the reaction mixture then diluted with water. The resultant precipitate was filtered giving 3-(2-acetamido-5-chloro - α - phenylbenzylideneamino)propyl acetate, M.P. 122–124°.

Analysis.—Calc'd for $C_{20}H_{21}ClN_2O_3$ (percent): C, 64.42; H, 5.81; N, 7.52; Cl, 9.51. Found (percent): C, 64.77; H, 5.73; N, 7.79; Cl, 9.70.

Example 15

2-amino-2',5-dichlorobenzophenone was reacted with ethanolamine according to the procedure of Example 5 to give 2-[2-amino-5-chloro-α-(o-chlorophenyl)benzylideneamino]ethanol, M.P. 123–125°.

*Analysis.*—Calc'd for $C_{15}H_{14}Cl_2N_2O$ (percent): C, 58.27; H, 4.56; N, 9.06; Cl, 22.93. Found (percent): C, 58.54; H, 4.62; N, 9.25; Cl, 22.70.

Example 16

2-methylamino-5 - chlorobenzophenone was refluxed with ethanolamine and the resultant reaction mixture poured into water. The aqueous phase was decanted from the resultant insoluble oil and this oil was washed several times with water, then dissolved in ether and the ether solution was dried and the ether removed in vacuo leaving a viscous oil, 2-(2-methylamino-5-chloro-α-phenylbenzylideneamino)ethanol.

*Analysis.*—Calc'd for $C_{16}H_{17}ClN_2O$ (percent); C, 66.54; H, 5.94; N, 9.70. Found (percent): C, 66.23; H, 5.75; N, 10.09.

Example 17

2-amino-5-chlorobenzophenone was reacted with benzylamine according to the procedure of Example 5 to give N-(2-amino-5-chloro-α-phenylbenzylidene)benzylamine, M.P. 122–124° and its tautomer N-(2-amino-5-chloro-α-phenylbenzyl)benzaldehyde imine.

*Analysis.*—Calc'd for $C_{20}H_{17}ClN_2$ (percent): C, 75.89; H, 5.34; N, 8.74; Cl, 11.07. Found (percent): C, 74.80; H, 5.44; N, 8.93; Cl, 11.10.

Example 18

2-benzylamino-5 - chloroacetophenone is reacted with ethanolamine according to the procedure of Example 5 to give 2-(2-benzylamino - 5 - chloro-α-methylbenzylideneamino) ethanol.

Example 19

5-bromo-2-dimethylaminobenzophenone is reacted with 2,2-diethoxyethylamine according to the procedure of Example 5 to give 2-(5-bromo-2-dimethylamino-α-phenylbenzylideneamino)-1,1-diethoxyethane.

Example 20

A solution of 23.1 g. of 2-amino-5-chlorobenzophenone and 45 g. of 4-(2-aminoethyl)morpholine in 100 ml. of xylene and a catalytic amount of zinc chloride was refluxed for 3 hours until the theoretical amount of water had separated out. The solvent was removed in vacuo and the residue recrystallized from heptane and then ethanol giving the α-isomer of N-[2-(2-amino-5-chloro-α-phenylbenzylideneamino)ethyl]morpholine, M.P. 140–142°.

*Analysis.*—Calc'd for $C_{19}H_{22}ClN_3O$ (percent): C, 66.36; H, 6.45; Cl, 10.32; N, 12.22. Found (percent): C, 66.13; H, 6.29; Cl, 10.40; N, 12.09.

The above heptane filtrate was concentrated to a small volume and the solid that precipitated out was recrystallized from cyclohexane and then alcohol-water giving the β-form of N-[2 - (2-amino-5-chloro-α-phenylbenzylideneamino)ethyl]morpholine, MP. 112–114° C.

*Analysis.*—Calc'd for $C_{19}H_{22}ClN_3O$ (percent): C, 66.36; H, 6.45; Cl, 10.32; N, 12.22. Found (percent): C, 66.17; H, 6.50; Cl, 10.35; N, 12.4.

Example 21

2-amino-5-chlorobenzophenone was reacted with 4-(3-aminopropyl)morpholine according to procedure of Example 20 to give the α- and β-isomers of N-[3-(2-amino-5-chloro-α-phenylbenzylideneamino)propyl]morpholine.

*Analysis.*—Calc'd for $C_{20}H_{24}ClN_3O$ (percent): C, 67.12; H, 6.76; Cl, 9.90; N, 11.75. α-Isomer, M.P. 91–92° Found (percent): C, 67.23; H, 6.76; Cl, 9.84; N, 11.94. β-Isomer, M.P. 118–119°—Found (percent): C, 67.36; H, 6.79; Cl, 9.94; N, 11.85.

Example 22

5-chloro-2-methylaminobenzophenone was reacted with 4-(2-aminoethyl)morpholine according to the procedure of Example 20 to give the α- and β-isomers of N-[2-(5-chloro - 2-methylamino-α-phenylbenzylideneamino)ethyl] morpholine.

*Analysis.*—Calc'd for $C_{20}H_{24}ClN_3O$ (percent): C, 67.12; H, 6.76; Cl, 9.90; N, 11.74. α-Form, M.P. 100–102° C.—Found (percent): C, 66.96; H, 665; Cl, 9.90; N, 11.53. β-Form, M.P. 123–125° C.—Found (percent): C, 66.84; H, 6.61; Cl, 9.80; N, 11.66

Example 23

2-(2-amino - 5 - chloro-α-phenylbenzylideneamino)-ethanol was reacted with acetic anhydride according to the procedure of Example 14 to give 2-(2-acetamido-5-chloro-α-phenylbenzylideneamino)ethyl acetate, M.P. 99–101°.

*Analysis.*—Calc'd for $C_{19}H_{19}ClN_2O_2$ (percent): C, 66.55; H, 4.10; N, 10.35. Found (percent): C, 66.45; H, 4.03; N, 10.55.

Example 24

N-[3-(2-chloroacetamido) - 5 - chloro-α-phenylbenzylipropyl] morpholine was reacted with chloroacetic anhydride according to the procedure of Example 14 to give N-[3-(2-chloroacetamido) - 5 - chloro-α-phenylbenzylideneamino) propyl]morpholine, M.P. 107–109°.

*Analysis.*—Calc'd for $C_{22}H_{25}Cl_2N_3O_2$ (percent): C, 60.83; H, 5.80; Cl, 16.33; N, 9.67. Found (percent): C, 60.92; H, 5.85; Cl, 16.30; N, 9.44.

Example 25

N-[2-(2-amino-5 - chloro-α-phenylbenzylideneamino) ethyl]morpholine was reacted with acetic anhydride according to the procedure of Example 14 to give N-[2-(2-acetamido - 5 - chloro-α-phenylbenzylideneamino)ethyl]-morpholine, MP. 147–149° C.

*Analysis.*—Calc'd for $C_{21}H_{24}ClN_3O_2$ (percent): C, 65.30; H, 6.27; Cl, 9.19; N, 10.89. Found (percent): C, 65.34; H, 6.13; Cl, 9.30; N, 10.73.

Example 26

3.5 g. of 2-(2-acetamido-5-chloro-α-phenylbenzylideneamino)ethyl acetate was dissolved in a solution of 5 ml. of 4 N sodium hydroxide and 50 ml. of ethanol. The solution was diluted with water and the solid recrystallized from carbon tetrachloride giving 2-(2-acetamido-5-chloro-α-phenylbenzylideneamino)ethanol, M.P. 143–145°.

*Analysis.*—Calc'd for $C_{17}H_{17}ClN_2O_2$ (percent): C, 64.45; H, 5.41; Cl, 11.19; N, 8.84. Found (percent): C, 64.60; H, 5.39; Cl, 11.20; N, 8.92.

Example 27

Reacting 2 - amino - 5-chlorophenyl-2-furyl ketone and methylthioethyl-amine according to Example 5 affords 2-[2-amino-5 - chloro-α-(2 - furyl)-benzylideneamino]-1-methylthioethane.

Example 28

Following the procedure of Example 1, 7,8-dimethyl-1,3-dihydro-5-phenyl-2H-1,4-benzodiazepin-2-one 4-oxide is converted to 2-amino-4,5-dimethyl-α-phenylbenzylideneaminoacetic acid N-oxide.

It will be understood that many changes and variations may be effected in the preparative methods of the invention without departing from the spirit and scope thereof.

What is claimed is:

1. A compound selected from the group consisting of and represented by the formulae:

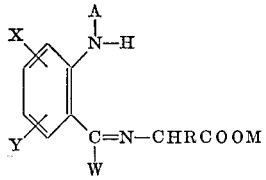

and

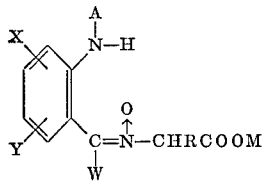

in which X and Y are members of the group consisting of hydrogen, chlorine, bromine, nitro, lower alkyl and trifluoromethyl, A is a member of the group consisting of hydrogen, lower alkyl and lower alkanoyl, W is a member of the group consisting of phenyl, thienyl and phenyl substituted by a member of the group consisting of chlorine and methyl while R is a member of the group consisting of hydrogen or lower alkyl and M is selected from the group consisting of hydrogen and an alkali metal cation.

2. As a compound of claim 1; 2-amino-5-chloro-α-phenylbenzylideneaminoacetic acid.

3. As a compound of claim 1; 5-chloro-2-methylamino-α-phenylbenzylideneaminoacetic acid.

4. As a compound of claim 1; 2-amino-5-chloro-α-phenylbenzylideneaminoacetic acid N-oxide.

5. As a compound of claim 1; 5-chloro-2-methylamino-α-phenylbenzylideneaminoacetic acid N-oxide.

6. The process which comprises treating with an alkali metal hydroxide a compound selected from the group consisting of and represented by the formula:

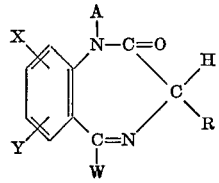

and

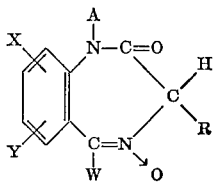

wherein X and Y are members of the group consisting of hydrogen, nitro, halogen, lower alkyl and halo(lower)alkyl; A is a member of the group consisting of hydrogen, lower alkyl and aralkyl; W is a member of the group consisting of lower alkyl, monocyclic aryl, thienyl and furyl; R is a member of the group consisting of hydrogen, lower alkyl and monocyclic aryl, to form a compound of the group consisting of and represented by the formulae:

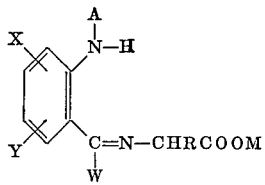

and

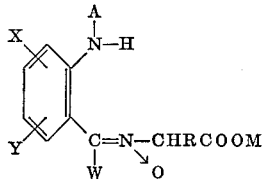

wherein A, R, W, X, and Y are as hereinbefore stated and M is the cation of an alkali metal hydroxide.

References Cited

UNITED STATES PATENTS 3,154,578   10/1964   Kinnel et al. _____ 260—518

LORRAINE A. WEINBERGER, Primary Examiner

L. ARNOLD THAXTON, Assistant Examiner

U.S. Cl. X.R.

260—332.2, 347.3, 519, 239.3, 247.2, 471, 562, 566